United States Patent
Shirahata

[11] Patent Number: 5,825,429
[45] Date of Patent: Oct. 20, 1998

[54] APPARATUS AND METHOD FOR GENERATING INTERPOLATED IMAGE DATA

[75] Inventor: Ryuji Shirahata, Asaka, Japan

[73] Assignee: Fuji Photo Film Co., Ltd.

[21] Appl. No.: 616,178

[22] Filed: Mar. 15, 1996

[30] Foreign Application Priority Data

Mar. 15, 1995 [JP] Japan ..................................... 7-082109
Apr. 27, 1995 [JP] Japan ..................................... 7-125604

[51] Int. Cl.$^6$ ...................................................... H04N 7/01
[52] U.S. Cl. ............................................. 348/448; 348/452
[58] Field of Search ..................................... 348/399, 400,
348/401, 404, 415, 431, 441, 451, 452
700, 352, 448; 386/8, 20, 34, 68, 110, 111,
116, 120, 121, 124; H04N 7/137, 5/93

[56] References Cited

U.S. PATENT DOCUMENTS

| | | | |
|---|---|---|---|
| 4,937,667 | 6/1990 | Choquet et al. | 348/448 |
| 4,967,271 | 10/1990 | Campbell et al. | 348/701 |
| 5,016,101 | 5/1991 | Richards et al. | 348/452 |
| 5,081,532 | 1/1992 | Rabil | 348/452 |
| 5,339,109 | 8/1994 | Hong | 348/441 |
| 5,444,493 | 8/1995 | Boie | 348/448 |

FOREIGN PATENT DOCUMENTS

| | | |
|---|---|---|
| 63-187785 | 8/1988 | Japan . |
| 486185 | 3/1992 | Japan . |
| 4366894 | 12/1992 | Japan . |

*Primary Examiner*—Tommy P. Chin
*Assistant Examiner*—Ronald D. House
*Attorney, Agent, or Firm*—Birch, Stewart, Kolasch & Birch, LLP

[57] ABSTRACT

Blur-free, high-quality frame image data are generated from field image data. Image data of odd-numbered field images and image data of even-numbered field images are alternately applied every 1/60 of a second. The even field image data are applied to a first memory, and data of odd field images located immediately before and immediately after the even field image are applied to respective ones of a second memory and a third memory. Windows are set on the respective images and whether or not motion has occurred between the windows of the two odd field images is detected. If motion has not occurred, data of a pixel missing in the even field is generated using the pixel, of an odd field, at a position corresponding to this pixel missing in the even field and for which data are to be generated. If motion has occurred, the data of a pixel missing in the even field image is generated using pixels above and below the missing pixel in the even field and for which data are to be generated.

19 Claims, 8 Drawing Sheets

Fig. 3

W3 — THIRD FIELD (ODD)

| (3,1) | (3,2) | (3,3) | (3,4) |
| (3,5) | (3,6) | (3,7) | (3,8) |
| (3,9) | (3,10) | (3,11) | (3,12) |
| (3,13) | (3,14) | (3,15) | (3,16) |
| (3,17) | (3,18) | (3,19) | (3,20) |
| (3,21) | (3,22) | (3,23) | (3,24) |
| (3,25) | (3,26) | (3,27) | (3,28) |
| (3,29) | (3,30) | (3,31) | (3,32) |

W2 — SECOND FIELD (EVEN)

| (2,1) | (2,2) | (2,3) | (2,4) |
| (2,5) | (2,6) | (2,7) | (2,8) |
| (2,9) | (2,10) | (2,11) | (2,12) |
| (2,13) | (2,14) | (2,15) | (2,16) |
| (2,17) | (2,18) | (2,19) | (2,20) |
| (2,21) | (2,22) | (2,23) | (2,24) |
| (2,25) | (2,26) | (2,27) | (2,28) |
| (2,29) | (2,30) | (2,31) | (2,32) |

W1 — FIRST FIELD (ODD)

| (1,1) | (1,2) | (1,3) | (1,4) |
| (1,5) | (1,6) | (1,7) | (1,8) |
| (1,9) | (1,10) | (1,11) | (1,12) |
| (1,13) | (1,14) | (1,15) | (1,16) |
| (1,17) | (1,18) | (1,19) | (1,20) |
| (1,21) | (1,22) | (1,23) | (1,24) |
| (1,25) | (1,26) | (1,27) | (1,28) |
| (1,29) | (1,30) | (1,31) | (1,32) |

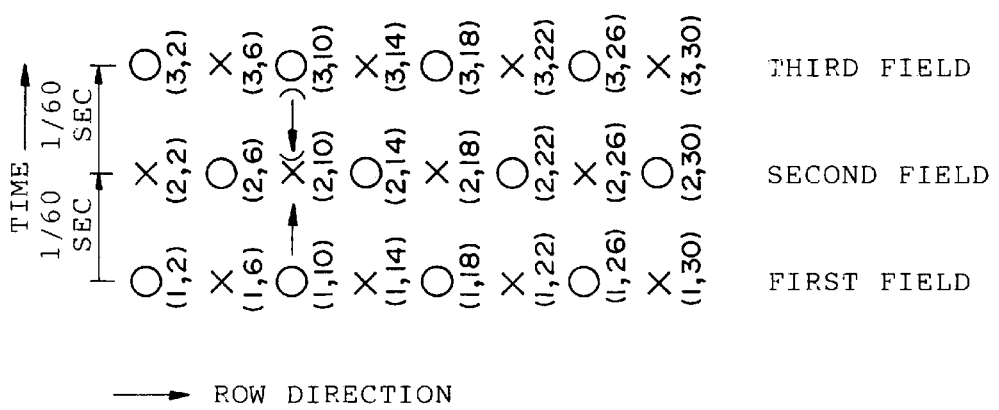
Fig. 4b  (B) MOTION DETECTED
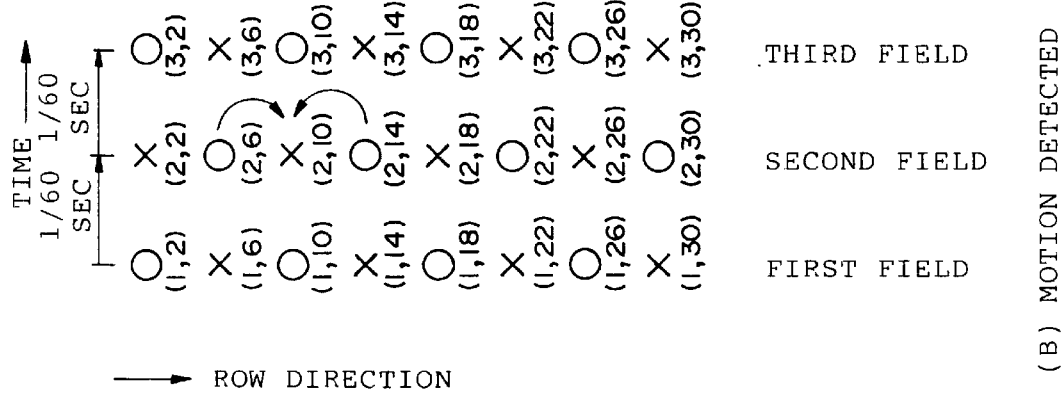
Fig. 4a  (A) NO MOTION DETECTED

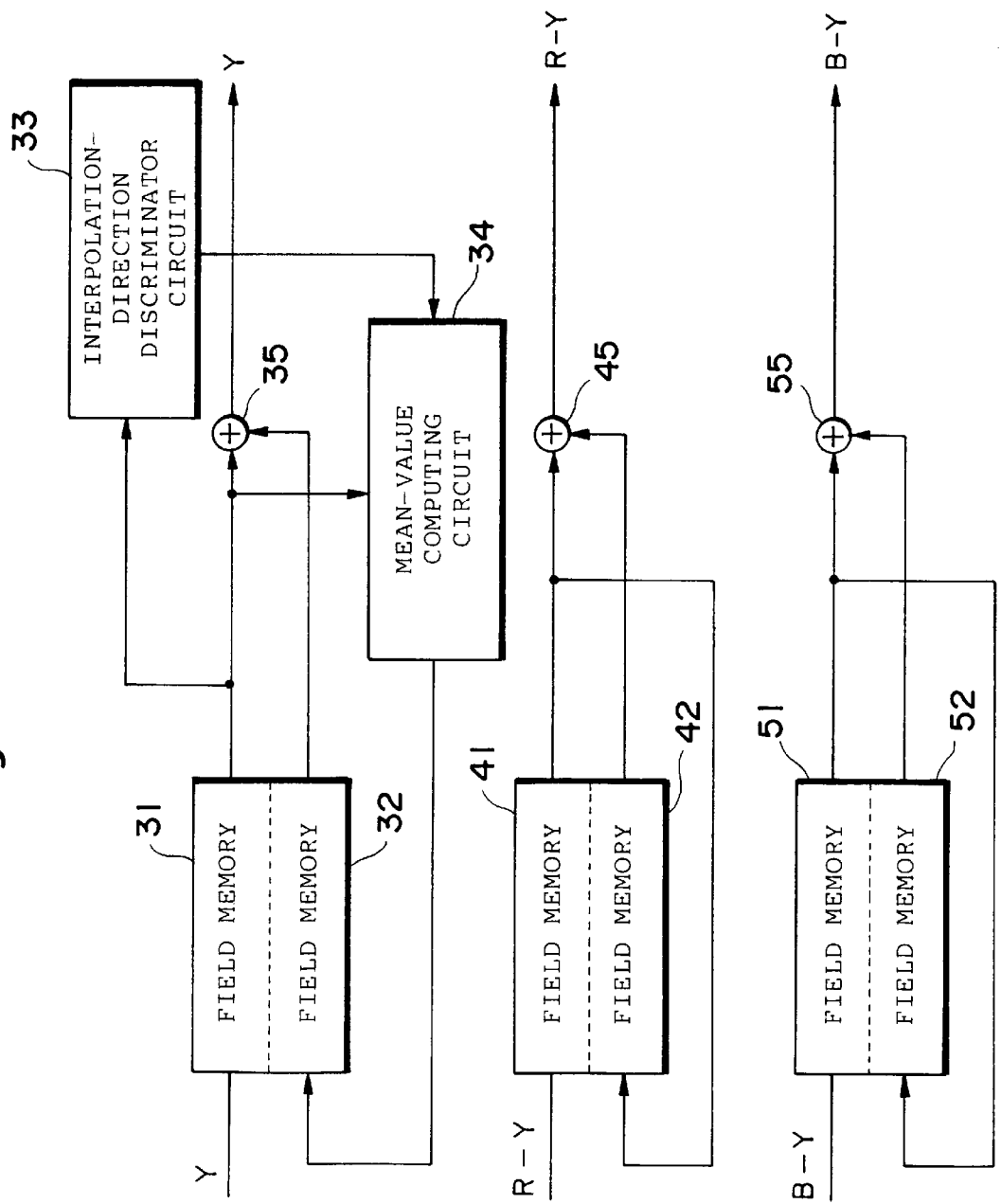

APPARATUS AND METHOD FOR GENERATING INTERPOLATED IMAGE DATA

BACKGROUND OF THE INVENTION

1. Field of the Invention

This invention relates to an apparatus and method for generating interpolated image data, particularly an apparatus and method for converting a field image, which comprises pixels of odd or even lines, to a frame image.

2. Description of the Related Art

A digital video tape recorder (DVTR) senses the image of a subject using a solid-state electronic image sensing device such as a CCD, converts a video signal, which represents the image of the subject obtained by image sensing, to digital image data and records the digital image data on magnetic tape. In a DVTR, the general practice when recording a moving picture is to perform interlaced readout of the CCD at a fixed period and alternately obtain a field image comprising pixels of odd lines and a field image comprising pixels of even lines. This makes it possible to shorten the image sensing period so that a smoothly moving image can be recorded even if the subject is moving rapidly.

In a case where a moving picture is reproduced, a field image comprising pixels of odd lines and a field image comprising pixels of even lines are alternately applied, whereby a frame image is constructed and displayed on a television. One frame image is constructed from two consecutive field images. For example, a first frame image is constructed from a first field image and a second field image, a second frame image is constructed from a third field image and a fourth field image, a third frame image is constructed from a fifth field image and a sixth field image, and a fourth frame image is constructed from a seventh field image and an eighth field image.

In order to meet the demand for printout of a desired scene, a DVTR having a still-picture reproduction function in addition to a moving-picture reproduction function has been developed. However, in DVTRs in which a field image obtained in moving-picture recording is printed out as is, vertical resolution is poor and a print having a high picture quality is not obtained because the field image is composed of pixels of odd lines or even lines only.

When a frame image is constructed from two consecutive field images in order to obtain a print having a high picture quality, a temporal offset develops between the two field images when the images are sensed. Consequently, if the subject is moving, the print obtained will not be clear because of blurring of the image. In order to solve this problem, a method is available through which pixel data are interpolated using image data of pixels immediately above and below a pixel for which image data are to be generated in the field image [For example, see the specification of Japanese Patent Application Laid-Open (KOKAI) No. 63-187785).]. However, a disadvantage with this method is that diagonal lines develop jaggies.

In order to solve this problem, directions having strong correlation are detected in the field image about the pixel for which image data is to be generated, interpolation is performed using the image data of pixels present along the detected directions, and a frame image is generated from the field image. [For example, see the specification of Japanese Patent Application Laid-Open (KOKAI) No. 4-366894).]

With this method, however, the improvement in vertical resolution and the elimination of jaggies in the diagonal direction are not necessarily satisfactory.

Furthermore, a technique is available in which a frame image is obtained by changing the interpolation method in dependence upon motion of the subject utilizing the fact that, in the recording of an image, a method of coding performed when the subject is at rest differs from that performed when the subject is moving. [For example, see the specification of Japanese Patent Application Laid-Open (KOKAI) No. 4-86185).] This requires judging whether the subject is moving or is at rest. In order to make this judgment, the general practice is to calculate a motion vector (using a motion vector method). However, calculating motion vectors involves a great deal of computation. In addition, using the motion vector method to obtain a high-quality still picture is impractical.

SUMMARY OF THE INVENTION

An object of the present invention is to make it possible to generate a frame image for a high-quality still picture, which has little image offset, from a field image that is for producing a moving picture.

According to a first aspect of the present invention, the foregoing object is attained by providing an apparatus in which, when data of consecutive first, second and third field images are given among a series of image data obtained by interlaced scanning wherein odd field images comprising pixels on odd lines and even field images comprising pixels on even lines repeat in alternating fashion, interpolated image data are generated representing pixels on even lines in a case where the second field is an odd field and pixels on odd lines in a case where the second field is an even field in order to convert the second field image, which is located between the first field image and the third field image, to a frame image. A motion detector detects whether motion has occurred between images in windows set at corresponding positions on respective ones of the first field image and third field image. A first interpolated image data generator which, when motion has been detected by the motion detecting means, generates image data of a pixel at a position corresponding to pixels in the windows based upon image data of pixels, of the second field, neighboring this pixel from above and below. A second interpolated image data generator which, when no motion has been detected by the motion detecting means, generates image data of a pixel at a position corresponding to pixels in the windows based upon image data of a corresponding pixel in at least one of the first field image and third field image.

The present invention according to the first aspect thereof also provides a method of generating interpolated image data. Specifically, the invention provides a method in which, when data of consecutive first, second and third field images are given among a series of image data obtained by interlaced scanning wherein odd field images comprising pixels on odd lines and even field images comprising pixels on even lines repeat in alternating fashion, interpolated image data are generated representing pixels on even lines in a case where the second field is an odd field and pixels of odd lines in a case where the second field is an even field in order to convert the second field image, which is located between the first field image and the third field image, to a frame image. The method includes detecting whether there is motion between images in windows set at corresponding positions on respective ones of the first field image and the third field image, performing first interpolated image data generating processing, when motion has been detected, for generating image data of a pixel at a position corresponding to pixels in the windows based upon image data of pixels, of the second field, neighboring this pixel from above and below, and performing second interpolated image data generating processing, when no motion has been detected, for generating image data of a pixel at a position corresponding to pixels in the windows based upon image data of a corresponding pixel in at least one of the first field image and third field image.

The motion detection processing and the first interpolated image data generating processing or second interpolated image data generating processing are repeated at each position of the windows while the positions of the windows are successively shifted on the first field image and third field image horizontally and vertically in increments of window size, and results of processing are combined with the second field image to obtain a frame image.

Motion can be detected to have occurred when the value of a sum is greater than a predetermined threshold value, wherein the sum is obtained by summing, within the windows, the differences between absolute values of the levels of corresponding pixels in the window of the first field image and the window of the third field image. It has been ascertained from the results of tests that the threshold value in this case desirably is a value obtained by multiplying the number of pixels constituting the window by a numerical value of 1~3 when the above-mentioned pixel level is represented by eight bits. It is especially preferred that the number of pixels constituting the window by multiplied by a numerical value of 1.5~2.5 when the pixel level is presented by eight bits.

It is preferred that the above-mentioned window be longer in the vertical direction than in the horizontal direction. For example, the number of pixels in the vertical direction desirably is twice the number of pixels in the horizontal direction. The reason for this is as follows: A field image consists solely of pixels on even lines or odd lines. This means that if the window is set to have the same lengths in the horizontal and vertical directions, the number of pixels in the vertical direction will be less than the number of pixels in the horizontal direction and it will be difficult to detect motion if the subject moves in the vertical direction.

In accordance with the first aspect of the present invention, motion between the images in windows set at corresponding positions on first and third field images is detected. If motion has been detected, the pixels in the window of the first field image are considered to have a greater correlation with the pixels in the window of the second field image than with the pixels in the window of the third field image. Interpolated image data are generated using the image data of pixels in the second field image, these pixels residing immediately above and below in the region corresponding to the window. The interpolated image data are generated using pixels having a strong correlation between them. If there is no motion, the correlation between a pixel in the window of the first field image and a pixel in the window of the third field image is construed to be strong. Accordingly, interpolated image data of the second field are generated using image data of a pixel of the first field and image data a pixel of the second field, these pixels being located at corresponding positions in the frames.

In accordance with the first aspect of the invention, a pair of pixels having strong correlation between them is found from a pair of pixels, one of which is contained in the image of the first field and the other of which is contained in the image of the third field, or a pair of pixels both of which are contained in image of the second field. Interpolated image data are generated from these pixels having strong correlation. Since a pair of pixels having strong correlation represents the same pixel, a frame image represented by the interpolated image data generated and the image data of the second field will have smooth edges. The second field image comprises odd lines or even lines and has a comparatively low resolution. However, the frame image obtained by performing pixel interpolation exhibits a high vertical resolution. A still picture having a high picture quality is obtained as a result.

Further, since motion vectors are not used, fewer calculations are necessary in comparison with a case where a frame image is obtained utilizing the motion vector method.

The processing for generating the first interpolated image data can be implemented by extracting image data representing pixels above and below a pixel missing in the second field image, as well as image data representing pixels above and below pixels which should be present at positions neighboring the missing pixel in the horizontal direction, obtaining values of sums of the image data representing these pixels, determining whether values of the sums obtained are increasing or decreasing with regard to pixels in the horizontal direction, generating data representing the missing pixel using the data representing the pixels above and below the missing pixel when the values of the sums are increasing or decreasing, calculating correlation values between pixels in three directions, namely of pixels above and below and diagonally above and below the missing pixel when the values of the sums are not increasing or decreasing, and generating data representing the missing pixel using data representing pixels which give the highest correlation value.

When the above-mentioned values of the sums are increasing or decreasing in the horizontal direction, the image of this portion is a step-shaped portion. In such case, there are instances where the step-shaped portion is emphasized when the data representing the missing pixel are generated. This can cause a disturbance in the image.

An interpolated image data generating apparatus that is available extracts image data representing two pixels in each of three directions, namely two pixels above and below a missing pixel, pixels at the upper right and lower left of the missing pixel and pixels at the upper left and lower right of the missing pixel, calculates the correlation values between these pixels and generates data representing the missing pixel from two pixels having the highest correlation. In this case, even when pixels having slightly different levels reside above and below the missing pixel and the levels of the pixels at the upper right and lower left of the missing pixel or at the upper left and lower right of the missing pixel are zero, the correlation between the two pixels at the upper right and lower left of the missing pixel and or between the two pixels at the upper left and lower right of the missing pixel is high. As a result, the missing pixel is generated using these two pixels. Consequently, an unnatural image different from the actual image is obtained.

In the description given above, interpolated image data of the missing pixel is generated using two pixels that give the highest correlation when the above-mentioned values of the sums are increasing or decreasing with regard to the horizontal direction, and interpolated image data of the missing pixel is generated using pixels above and below the missing pixel when the above-mentioned values of the sums are not increasing or decreasing with regard to the horizontal direction. As a result, any step-portion that might exist is not emphasized and an image close to the actual image is obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 illustrates, in the form of a plane, the corresponding relationship between pixels for generating frame image data;

FIGS. 4a and 4b illustrate, in the form of a time series, the corresponding relationship between pixels for generating frame image data;

FIG. 5 is a block diagram showing the electrical construction of a circuit for calculating interpolated pixel values;

DESCRIPTION OF THE PREFERRED EMBODIMENT

Figure 1:
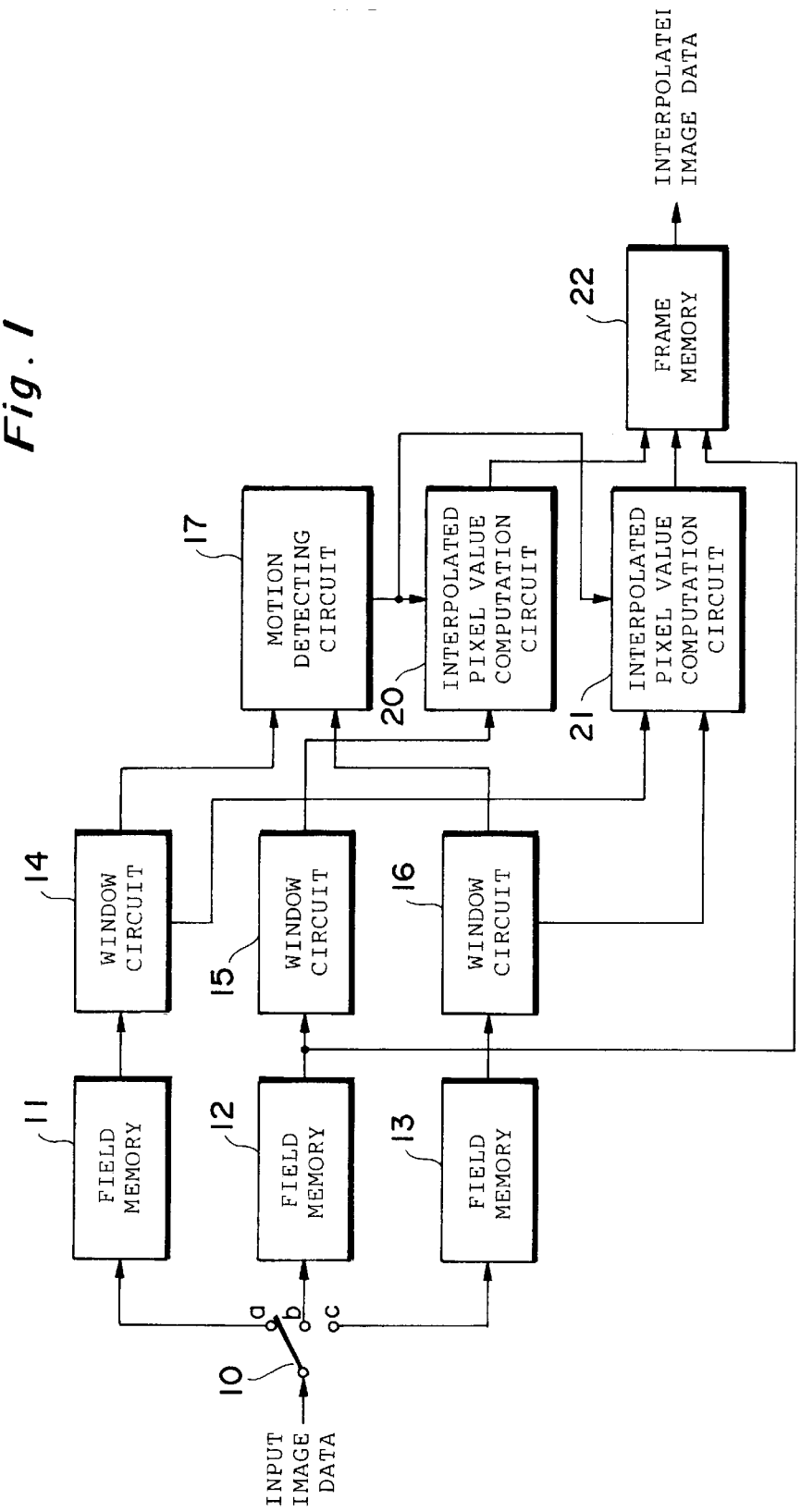
FIG. 1 is a block diagram showing the electrical construction of an apparatus for generating frame image data according to an embodiment of the present invention.

FIG. 1 is a block diagram showing the electrical construction of an apparatus for generating frame image data from field image data according to an embodiment of the present invention. In a case where the data of at least three field images, namely first, second and third field images, are contiguous in the order mentioned and odd- and even-numbered field images appear alternately, the apparatus generates the frame image data from the second field image data.

Figure 2:
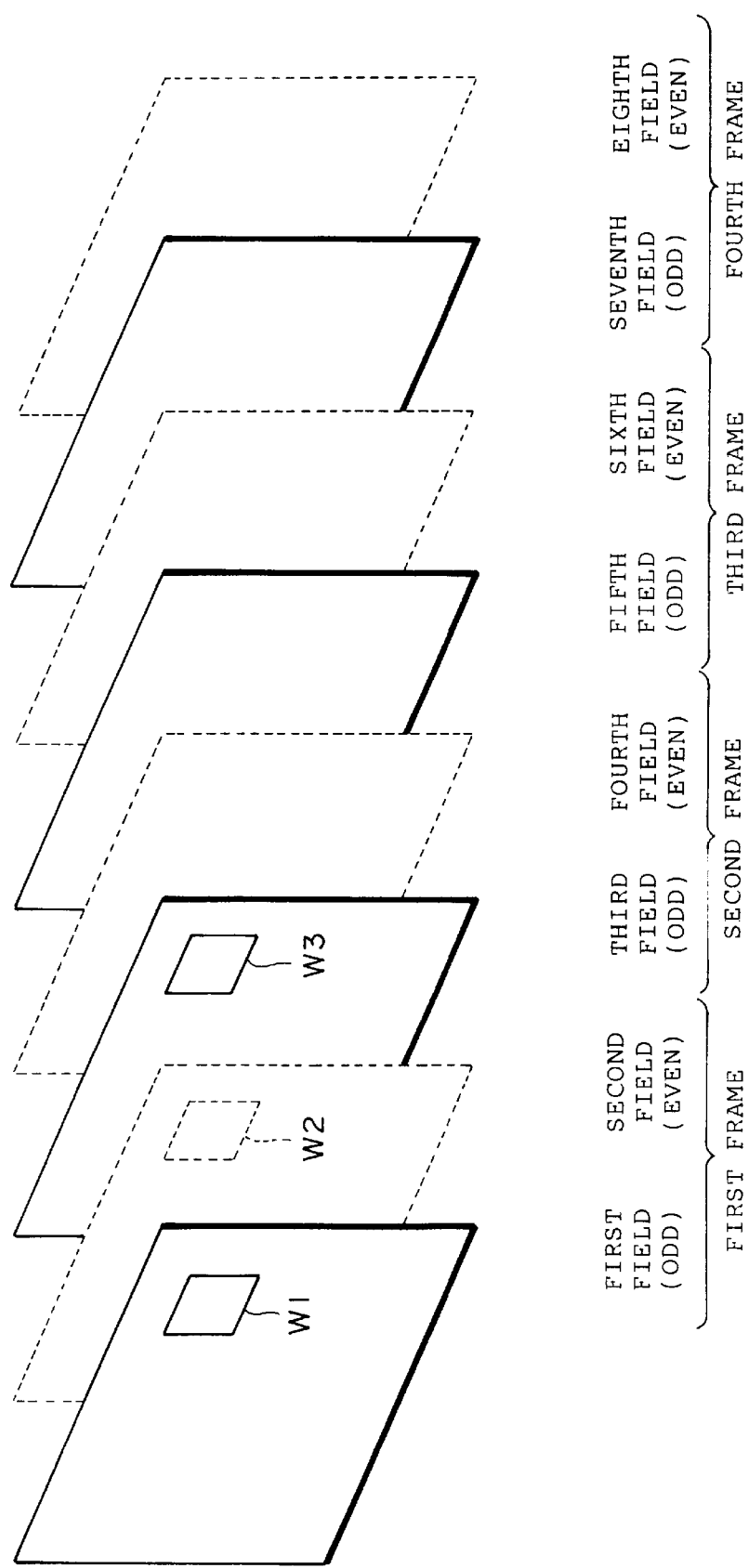
FIG. 2 illustrates the manner in which odd-numbered field images and even-number field images appear in alternating fashion.

As shown in FIG. 2, the given image data are such that odd field images (first, third, fifth and seventh field images), each of which comprises pixels on odd-numbered lines, and even field images (second, fourth, sixth and eighth field images), each of which comprises pixels on even-numbered lines, appear alternately. A case will be described in which a frame image is generated by interpolating image data of the second field when the first, second and third field images in FIG. 2 are given consecutively in the order mentioned.

The apparatus for generating the frame image data includes three field memories 11, 12 and 13. Changeover of a changeover switch 10 is controlled in such a manner that field image data that generates frame image data by being interpolated is stored in a field memory 12 among the field memories 11, 12 and 13, and field image data before and after this field image data are stored in the field memory 11 or field memory 13, respectively. In this example, it is assumed that the image data of the first field is stored in the field memory 11 and that the image data of the third field is stored in the field memory 13. The image data of the second field is stored in the field memory 12.

Though the changeover switch 10 is illustrated as being a contact switch, in actuality the switch 10 is implemented in the form of a semiconductor contactless switch (a gate circuit, etc.) as a matter of course.

FIG. 3 illustrates pixel groups of eight pixels in the row (vertical) direction and four pixels in the column (horizontal) direction extracted from the first, second and third field image data through windows W1, W2 and W3. Since the first field image data and the third field image data are image data of odd-numbered fields, image data representing the pixels on odd-numbered rows are present. Since the second field image data are image data of an even-numbered field, image data representing the pixels on even-numbered rows are present. Pixels at which image data exist are indicated by hatching in FIG. 3. Further, FIG. 3 is drawn in the form of a plane in order to facilitate an understanding of the pixel arrays.

In the apparatus of FIG. 1 for generating frame image data, it is determined whether motion has occurred between the image in the window W1 of the first field and the image in the window W3 of the third field. If there is no motion, this means that the image in window W3 is unchanged from the image in window W1. It is construed, therefore, that the image in window W2 of the second field image has a strong correlation to the image in window W1 of the first field and the image in window W3 of the third field image, and the pixels of the missing odd-numbered rows in the second field image are generated using the image data of the corresponding pixels of the first and third fields. If motion does occur, it is considered that there has been a change of scene or the like. Accordingly, it is construed that the image in window W2 of the second field image does not have a strong correlation to the image in window W1 of the first field image or to the image in window W3 of the third field image, and the pixels of the missing odd-numbered rows in the second field image are generated using the image data of the pixels that are present in the window W2 of the second field image. The determination as to whether motion has occurred between the window W1 of the first field image and the window W3 of the third field image can be implemented by calculating the difference between the absolute values of the image data of corresponding pixels in the windows W1 and W3 with regard to all pixels present in the windows W1 and W3, and judging whether the sum obtained by summing all of these differences is greater than a predetermined threshold value. The threshold value preferably is one obtained by multiplying the number of pixels constructing a window by a numerical value of 1~3, especially a numerical value of 1.5~2.5, in a case where the level of the image data representing a pixel is represented by eight bits.

As one example, a case will be described in which data representing a pixel (2,10) of the second field is generated by interpolation processing. FIGS. 4a and 4b illustrate the pixels of the second column in which the pixel (2,10) in window W2 of the second field image exists, as well as the pixels in window W1 of the first field image and in window W3 of the third field image corresponding to the pixels of the second column of window W2. Pixels at which data exist are indicated by the circle marks in FIGS. 4a and 4b, and pixels at which there are no data are indicated by the "x" marks. As will be understood from FIG. 3 and FIGS. 4a, 4b, pixels exist in the odd rows of the first and third field images and in the even rows of the second field image.

It is determined whether motion has occurred between the image in window W1 of the first field image and the image in window W3 of the third field image. If motion has not occurred, the mean of the image data of pixel (1,10) of the first field image and the image data of pixel (3,10) of the third field image (the pixels (1,10) and (3,10) are at the positions corresponding to the pixel (2,10) of the second field image) is calculated and the mean image data are adopted as the image data of the pixel (2,10) of the second field image, as shown in FIG. 4a. If motion has occurred, on the other hand, the mean of the image data of pixels (2,6) and (2,14) above and below the pixel (2,10) of the image of the second field is calculated and these mean image data are adopted as the image data of the pixel (2,10) of the second field image, as illustrated in FIG. 4b.

In the case where there is no motion, either the image data of pixel (1,10) of the first field image or the image data of pixel (3,10) of the third field image (the pixels (1,10) and (3,10) are at the positions corresponding to the pixel (2,10) of the second field image, as mentioned above) may be adopted as the image data of the pixel (2,10) of the second field image. In such case, it is preferred that use be made of the image data of the pixel of the image constituting the same frame. For example, with regard to the image of the second field, the image constituting the same frame is the image of the first field; hence, use is made of the image data of pixel (1,10) of the image of the first field.

All of the image data of pixels of the missing even rows in the window W2 of the second field are generated in the same manner as the image data of pixel (2,10). The processing for generating the image data of missing pixels is carried out with regard to the entirety of the second field image, whereby the image data of the second field image becomes the frame image data.

The window is not limited to a rectangular window the length of which extends in the row direction. It is permissible to use a square window. Further, the window is not limited to one having eight pixels in the row direction and four pixels in the column direction. The window can be set at will to pixel arrays of 4×4 pixels, 8×8 pixels, 16×16 pixels, 16 pixels in the row direction by eight pixels in the column direction, four pixels in the row direction by two pixels in the column direction, etc.

With reference again to FIG. 1, window circuits 14, 15 and 16 set the aforementioned windows W1, W2 and W3 on the field image data that have been stored in the field memories 11, 12 and 13. From among the windows W1, W2 and W3 that have been set by the window circuits 14, 15 and 16, the image data of pixels contained in the window W1 of the first field image and the image data of pixels contained in the window W3 of the third field image are applied to a motion detecting circuit 17, whereby it is determined whether motion has occurred between the image in window W1 and the image in window W3. A signal representing the result of detection performed by the motion detecting circuit 17 is applied to a first interpolated pixel value computation circuit 20 and to a second interpolated pixel value computation circuit 21.

The windows W1, W2 and W3 set by the window circuits 14, 15, and 16 are scanned horizontally and vertically so as not to overlap one another on the same field image. Interpolated image data are calculated at each scanning position. Accordingly, interpolated image data are generated with regard to the pixels on all odd rows of the second field image.

The window circuits 14, 15 and 16 can each be constructed from a plurality (e.g., four) of cascade-connected line memories. The motion detecting circuit 17 can be constructed from a subtractor circuit, a squaring circuit, an adder circuit and a level discriminator circuit. In a case where the above is implemented by software, either the setting of the windows or the detection of motion or both of these operations would be implemented by a computer so programmed.

The image data of the pixels contained in the windows W1 and W3 set by the window circuits 14 and 16 are also applied to the second interpolated pixel value computation circuit 2 1. The image data of the pixels contained in the window W2 set by the window circuit 15 are applied to the first interpolated pixel value computation circuit 20.

The first interpolated pixel value computation circuit 20 is provided with image data representing the pixels above and below a missing pixel. This is data of the same field image as that of the missing pixel, as shown in FIG. 4b. The second interpolated pixel value computation circuit 21 is provided with image data representing the pixels at the positions corresponding to that of the missing pixel of the second field image, this being the pixel for which interpolated image data is to be generated. The provided image data are data of the first field image and data of the third field image that come before and after the second field image having the missing pixel for which the interpolated image data in to be generated, as shown in FIG. 4a. The first interpolated pixel value computation circuit 20 operates and the second interpolated pixel value computation circuit 21 ceases operating when the motion detection signal provided by the motion detecting circuit 17 is indicative of motion. The second interpolated pixel value commutation circuit 21 operates and the first interpolated pixel value computation circuit 20 ceases operating when the motion detection signal provided by the motion detecting circuit 17 indicates no motion. Accordingly, results of interpolation are output from either circuit 20 or 21, depending upon whether there is motion between windows W1 and W3.

When there is no motion, the interpolated pixel value computation circuit 21 may be provided with the data of the pixel of the first field image or data of the pixel of the third field image, which pixel is at the position corresponding to the pixel of the second field image to be generated. In such case the interpolated pixel value computation circuit 21 would not calculate a mean and would merely allow the data to pass through.

The image data output by the interpolated pixel value computation circuit 20 or 21 is applied to a frame memory 22. The image data of the second field image that has been stored in the field memory 12 also is applied to the frame memory 22. By generating data representing all pixels of missing even-numbered rows of the second field image in the interpolated pixel value computation circuit 20 or 21 and applying these data to the frame memory 22, these data are combined with the data of the second field image already stored in the frame memory 12, thereby forming a frame image.

In the description given above, the interpolated pixel value computation circuits 20 and 21 are averaging circuits for calculating the mean value of input image data representing two pixels. However, an arrangement may be adopted in which the first interpolated pixel value computation circuit 20 is made to generate the interpolated image data in a manner described below. Further, an arrangement may be adopted in which the outputs of the window circuits 14, 15 and 16 are applied to a single interpolated pixel value computation circuit which then proceeds to calculate the interpolated pixel value.

Figure 6:
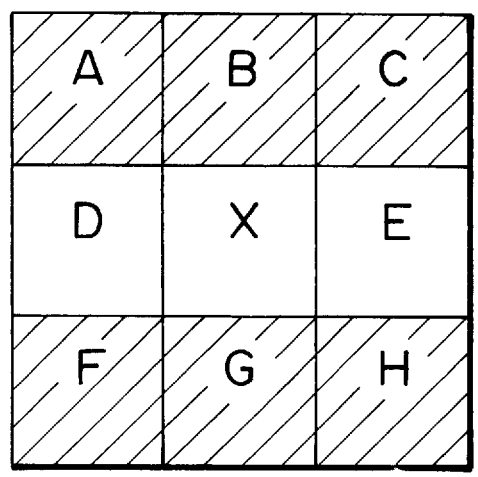
FIG. 6 illustrates a pixel block for generating the data of a missing pixel.

FIG. 5 is a block diagram showing the electrical construction of the interpolated pixel value computation circuit. FIG. 6 illustrates a pixel block composed of 3×3 pixels. Pixels for which image data exist are indicated by hatching in FIG. 6 in the same manner as in FIG. 3. In FIG. 6, image data exist for pixels A, B, C, F, G and H but there is no image data for pixels D, X and E.

In a case where a pixel for which data are to be generated is represented by X, as shown in FIG. 6, the interpolated pixel value computation circuit shown in FIG. 5 considers a pixel block of 3×3 pixels centered on the pixel X and generates suitable image data of the pixel X by referring to the image data representing the pixels contained in this pixel block.

If, when pixels (A and F, B and G, C and H) above and below pixels for which there are no image data are added, the value of the sum increases or decreases in the horizontal direction, the image of this portion is a step-shaped portion. If the arithmetic mean of the image data of the pixels above and below a pixel for which there are no image data are adopted as the image data of the missing pixel, the step-shaped portion will be emphasized. On the other hand, if the correlation values of two pixels bracketing the pixel X are calculated and the arithmetic mean of the two pixels giving the highest correlation is adopted as the image data of the missing pixel, there are instances where the result is an unnatural image, as when the levels of the image data of the pixels A, F, C and H in the columns adjoining the column of the mixing pixel X are extremely low and the correlation high (e.g., when all the levels are zero) or when the levels of the image data of pixels B and G above and below the pixel X are high and the correlation low (e.g., when the levels are the maximum level and near the maximum level).

The interpolated pixel value computation circuit shown in FIG. 5 is so adapted that even if the portion of the image for which data are to be generated is a step-shaped portion, interpolated image data of a missing pixel are generated without emphasizing the step-shaped portion and in such a manner that a natural image is obtained. The interpolated pixel value computation circuit shown in FIG. 5 finds two pixels deemed to be the most favorable for generating the image data of a missing pixel and adopts the mean value of the image data of these two pixels as the image data representing the missing pixel.

Figure 7:
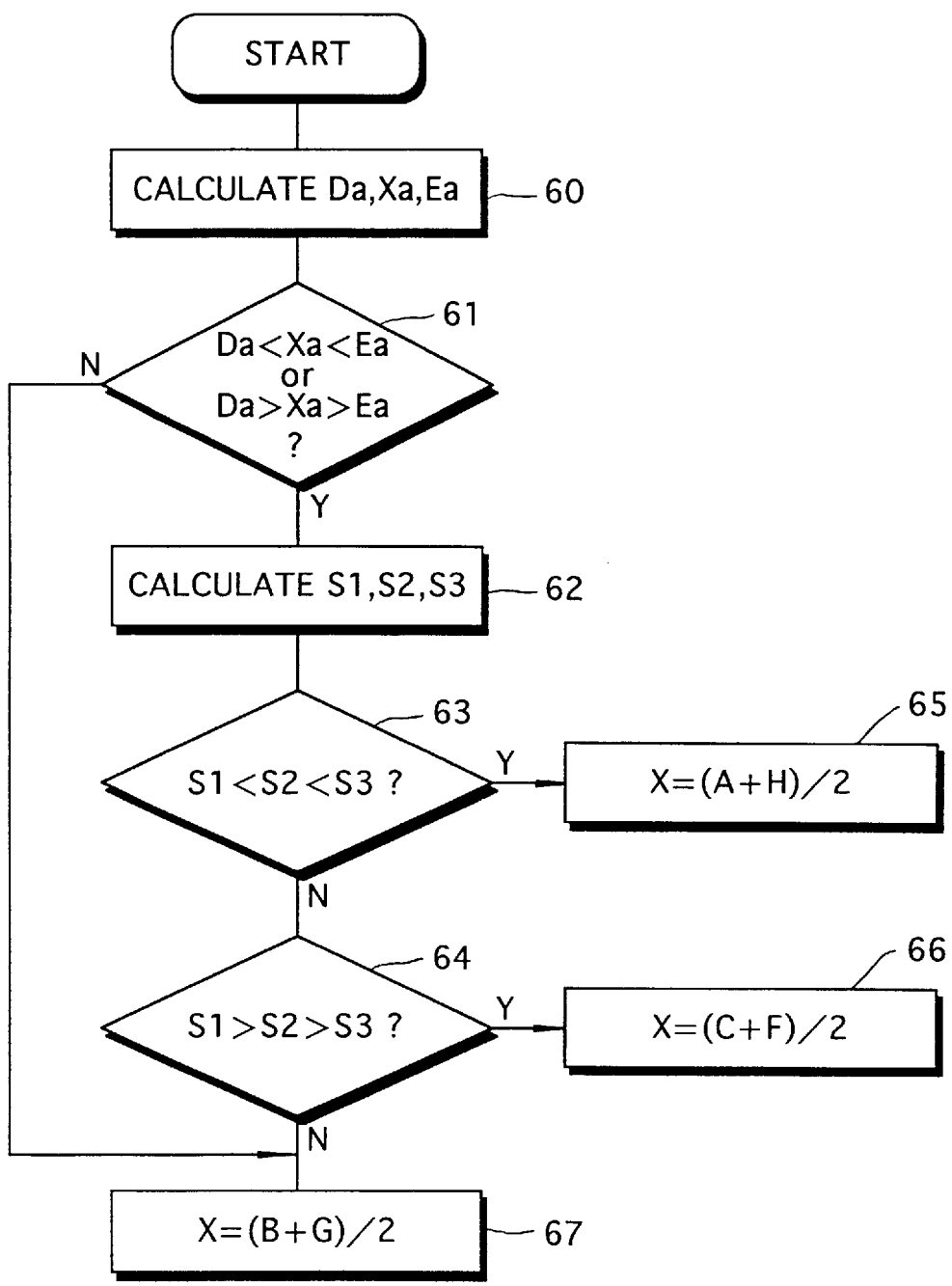
FIG. 7 is a flowchart illustrating a processing procedure for generating the data of a missing pixel.

FIG. 7 illustrates a procedure for generating the image data of a missing pixel. The level of image data representing a pixel is indicated by the same character as that used to identify the pixel.

First, the sum Da of the image data of pixels A and F, the sum Xa of the image data of pixels B and G and the sum Ea of the image data of pixels C and H are calculated (step 60). The sums Da, Xa and Ea obtained are compared and it is determined whether they are increasing (Da<Xa<Ea) or decreasing (Da>Xa>Ea) in the horizontal direction (step 61). If the sums are not increasing or decreasing ("NO" at step 61), then it is construed that the peripheral portion of pixel X for which data are to be generated is not a step-shaped portion and the mean value of the image data of pixels B and G above and below the pixel X is adopted as the image data of the pixel X (step 67). If the sums are increasing or decreasing ("YES" at step 61), then it is construed that the peripheral portion of pixel X for which data are to be generated is a step-shaped portion. If the mean value of the image data of pixels B and G above and below the pixel X were to be adopted as the image data of the pixel X, the step-shaped portion would be emphasized. Accordingly, the mean value of the image data of the pair of pixels having the highest correlation of the two pairs of pixels lying diagonal to the pixel X is adopted as the image data of pixel X.

The difference S1 (=|A−H|) between the absolute values of the image data of pixel A to the upper left of pixel X and of the image data of pixel H to the lower right of pixel X, the difference S2 (=|B−G|) between the absolute values of the image data of pixel B above pixel X and of the image data of pixel G below pixel X, and difference S3 (=|C−F|) between the absolute values of the image data of pixel C to the upper right of pixel X and of the image data of pixel F to the lower left of pixel X are calculated (step 62). The combination of pixels having the highest correlation is judged based upon the results of calculating these absolute-value differences (steps 63 and 64). The mean of the image data of the pixels giving the highest correlation is adopted as the image data of pixel X (step 65, 66 or 67).

With reference to the upper part of FIG. 5, one frame of digital image data representing luminance is stored in a field memory 31. Image data representing the pixels (A, B, C, F, G and H) at the upper left, above, upper right, lower left, below and lower right of the pixel X for which data are generated are read out of the field memory 31 and the data are applied to an interpolation-direction discriminator circuit 33 and a mean-value computing circuit 34. The interpolation-direction discriminator circuit 33 executes the processing of steps 60~64 shown in FIG. 7. When the best two pixels for generating the image data of pixel X are found in the interpolation-direction discriminator circuit 33, the signals representing these two pixels are applied to the mean-value computing circuit 34. The latter executes the processing (steps 65~67 of FIG. 6) for calculating the mean value of the image data of the two optimum pixels. The data representing the result of calculation in the mean-value computing circuit 34 are applied to a field memory 32, where the data are stored. By repeating the interpolation-direction discrimination processing in the interpolation-direction discriminator circuit 33 and the mean-value computation processing in the mean-value computing circuit 34, all of the data representing the pixels of missing lines in one frame of field image data are generated and stored in the field memory 32.

The image data that have been stored in the field memory 31 and the image data that have been stored in the field memory 32 are image data of mutually different lines in one frame of an image. For example, the image data that have been stored in the field memory 31 are image data of odd-numbered lines and the image data that have been stored in the field memory 32 are image data of even-numbered lines. By combining these image data, therefore, frame image data of one complete frame are formed. The image data that have been stored in the field memories 31 and 32 are applied to an adder circuit 35. As a result, the adder circuit 35 outputs one frame of frame image data.

With regard to R−Y and B−Y color-difference data, the data representing the pixel of a missing row makes use of the image data representing the pixel lying above the missing pixel.

With reference to the center and lower parts of FIG. 5, one frame of color-difference data R−Y and one frame of color-difference data B−Y are stored in respective field memories 41 and 51 as field image data. The color-difference data that have been stored in the field memories 41 and 51 are read out and applied to field memories 42 and 52, respectively. The R−Y color-difference data that have been stored in the frame memories 41 and 42 are read out and applied to an adder circuit 45. Of the R−Y color-difference data output by the field memory 41, the adder circuit 45 inserts the R−Y color-difference data of the corresponding pixel in the data of the pixel of the missing row. As a result, the adder circuit 45 outputs one frame of R−Y color-difference data. With regard also to the B−Y difference data, and in a manner similar to that of the R−Y color-difference data, the data are stored in field memories 51 and 52, the data of the corresponding pixel are inserted in the data of the pixel of the missing row in an adder circuit 55 and one frame of B−Y color-difference data are outputted by the adder circuit 55.

Thus, one frame of luminance data and R−Y, B−Y color-difference data are obtained.

The above-described processing for generating interpolated image data is applicable not only to luminance data but also to all types of data such as both luminance data and color-difference data and all or part of R, G, B color image data (e.g., only G-color image data).

The above-described apparatus for generating frame image data is well-suited for use in a digital video tape recorder or digital image data reproducing apparatus of the kind described below in detail.

Figure 8:
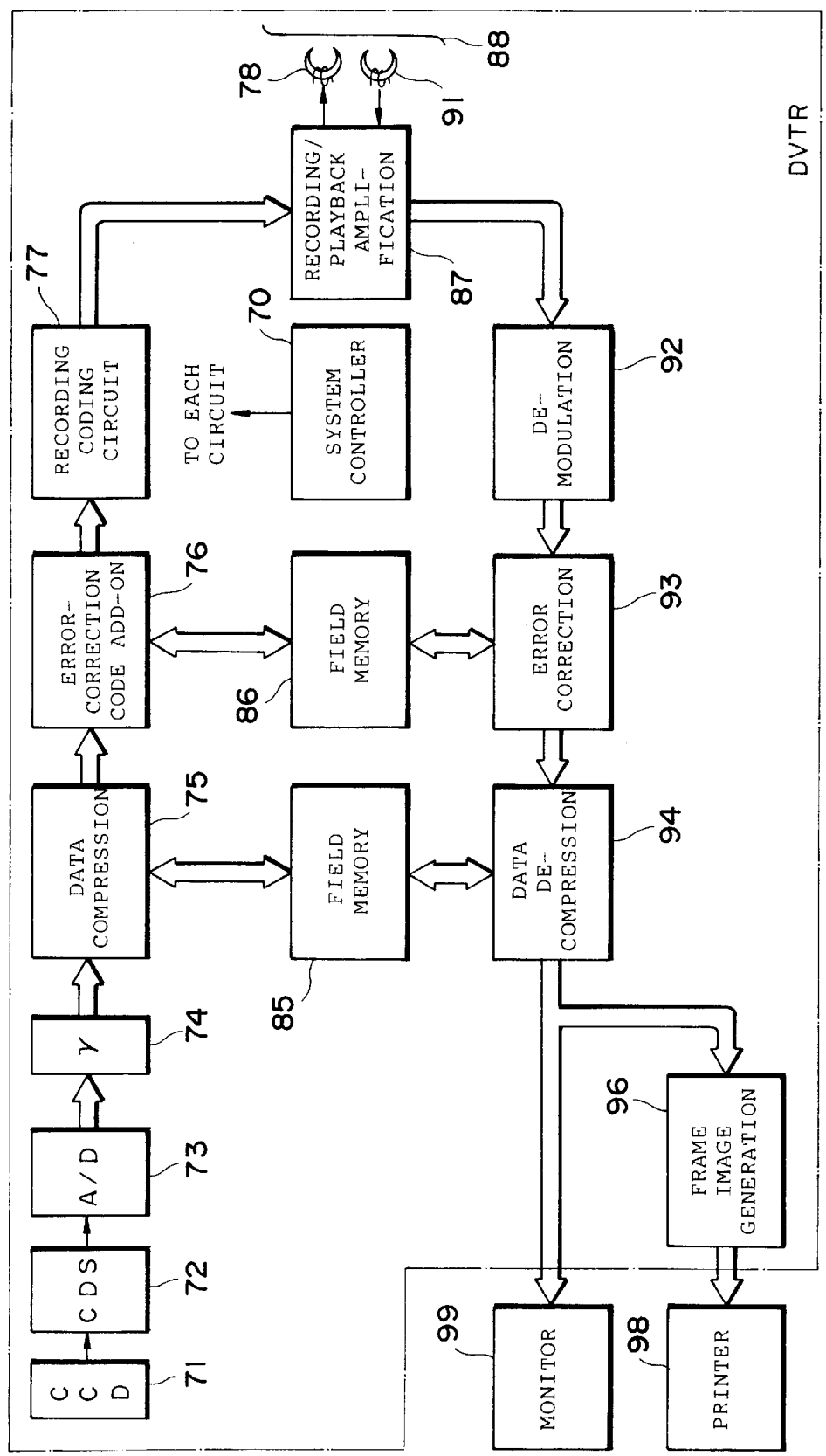
FIG. 8 is a block diagram showing the electrical construction of a digital video tape recorder.

FIG. 8 is a block diagram showing the electrical construction of a digital video tape recorder (DVTR) capable of recording and playing back digital image data. The overall operation of the digital video tape recorder is supervised by a system controller 70.

The digital video tape recorder performs photography in such a manner that odd-numbered field images each comprising images on odd-numbered lines and even-numbered field images each comprising images on even-numbered lines are photographed in alternating fashion, with photography being repeated at a period of 1/60 of a second.

Shutter speed for photography is decided by so-called electronic shutter control so as to take on an appropriate value (e.g., 1/60 of a second or a shorter time if necessary). A video signal representing the image of a subject is outputted by a CCD 71 every 1/60 of a second, and the video signal is applied to a CDS (correlated double sampling) circuit 72. The CDS circuit 72 removes kTC noise components from the video signal, after which the video signal is converted to digital image data by an analog/digital converter circuit 73. The digital image data are applied to a gamma-corrector circuit 74, where the data are subjected to a gamma correction. The gamma-corrected digital image data are applied to a field memory 85 via a data compression circuit 75 (though the data are not compressed at this time). The data are stored in the field memory 85 temporarily.

The image data output by the field memory 85 are applied to the data compression circuit 75 which, by executing DCT (discrete cosine transform) processing and quantization processing, subjects the image data to data compression. The image data that have been compressed by the data compression circuit 75 are applied to a field memory 86 through an error correction code add-on circuit 76 (which merely allows the data to pass). The data are stored in the field memory 86 temporarily.

The image data that have been stored in the field memory 86 are successively applied to the error correction code add-on circuit 76, which proceeds to add on error correction codes.

The image data output by the error correction code add-on circuit 76 are applied to a recording coding circuit 77. The latter performs coding (e.g., NRZI coding) and delivers its output to a recording/playback amplifier circuit 87. The image data that have been amplified in the recording/playback amplifier circuit 87 is applied to a magnetic head 78. As a result, image data are recorded by the magnetic head 78 in a video recording area of each track on a magnetic tape 88. Recording of audio data and track information also is performed as a matter of course.

The digital video tape recorder shown in FIG. 8 is also capable of reproducing digital image data that have been stored on the magnetic tape 88. Playback modes preferably include a movie playback mode and still playback mode.

In the mode for playing back digital image data, the image data and other data that have been recorded on the magnetic tape 88 are read out by a magnetic head 91 and applied to the recording/playback amplifier circuit 87. The data amplified by the recording/playback amplifier circuit 87 are applied to a demodulator circuit 92. Data demodulation is performed by the demodulator circuit 92 and the demodulated data are applied to and temporarily stored in the field memory 86 via an error correction circuit 93. The data that have been recorded in the field memory 86 are read out and applied to an error correction circuit 93. If the data demodulated by the demodulator circuit 92 contain a data error, then error correction processing is executed in the error correction circuit 93. The digital image data representing the image of the subject in the data that have been subjected to error correction processing are applied to the field memory 85 via a data decompression circuit 94.

In the movie playback mode, the image data that have been stored in the field memory 85 are applied to the data decompression circuit 94, whereby the compressed image data are subjected to data decompression processing. The data of the odd field images and the data of the even field images are alternately applied to a monitor display unit 99 to reproduce a movie. The monitor display unit 99 may be provided on the digital video tape recorder.

The digital video tape recorder illustrated in FIG. 8 is also capable of still-picture playback in addition to movie playback. In the still-picture playback mode, the image data that have been decompressed in the data decompression circuit 94 are applied to an apparatus 96 for generating frame image data.

In the manner described above, the apparatus 96 generates frame image data from field image data representing a field image. The generated frame image data are applied to a printer 98 to print a blur-free, high-quality still picture.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for generating interpolated image data in which, when data of consecutive first, second and third field images are given from among a series of image data obtained by interlaced scanning wherein odd field images comprising pixels on odd lines and even field images comprising pixels on even lines repeat in alternating fashion, interpolated image data are generated representing pixels on even lines in a case where the second field is an odd field and pixels on odd lines in a case where the second field is an even field in order to convert said second field image, which is located between the first field image and the third field image, to a frame image, said apparatus comprising:

motion detecting means for detecting whether motion has occurred between images in windows set at corresponding positions on respective ones of the first field image and third field image, wherein said windows are longer vertically than horizontally;

first interpolated image data generating means which, when motion has been detected by said motion detecting means, is for generating image data of a pixel at a position corresponding to pixels in said windows based upon image data of pixels, of the second field, neighboring this pixel from above and below; and second interpolated image data generating means which, when no motion has been detected by said motion detecting means, is for generating image data of a pixel at a position corresponding to pixels in said windows based upon image data of a corresponding pixel in at least one of said first field image and said third field image.

2. The apparatus according to claim 1, further comprising means for performing control so as to repeat, at each position of said windows, motion detection processing by said motion detecting means and interpolated image data generating processing by said first interpolated image data generating means or interpolated image data generating processing by said second interpolated image data generating means while the positions of said windows are successively shifted on the first field image and third field image horizontally and vertically in increments of window size.

3. The apparatus according to claim 1, wherein said motion detecting means detects that motion has occurred when the value of a sum is greater than a predetermined threshold value, wherein said sum is obtained by summing, within said windows, differences between absolute values of levels of corresponding pixels in the window of the first field image and the window of the third field image.

4. The apparatus according to claim 3, wherein said threshold value is a value obtained by multiplying the number of pixels constituting said window by a numerical value of 1~3 when the pixel level is represented by eight bits.

5. The apparatus according to claim 3, wherein said threshold value is a value obtained by multiplying the number of pixels constituting said window by a numerical value of 1.5~2.5 when the pixel level is represented by eight bits.

6. The apparatus according to claim 1, wherein the number of pixels vertically of said windows is twice the number of pixels horizontally.

7. The apparatus according to claim 1, wherein said first interpolated image data generating means includes:

means for extracting image data representing pixels above and below a pixel missing in the second field image, as well as image data representing pixels above and below pixels which should be present at positions neighboring the missing pixel in the horizontal direction, obtaining values of sums of the image data representing these pixels, and determining whether the values of said sums obtained are increasing or decreasing with regard to pixels in the horizontal direction; and means for generating data representing the missing pixel using the data representing the pixels above and below the missing pixel when the values of said sums are increasing or decreasing, calculating correlation values between pixels in three directions, namely of pixels above and below and diagonally above and below the missing pixel when the values of said sums are not increasing or decreasing, and generating data representing the missing pixel using data representing pixels which give the highest correlation value.

8. A method of generating interpolated image data in which, when data of consecutive first, second and third field images are given from among a series of image data obtained by interlaced scanning wherein odd field images comprising pixels on odd lines and even field images comprising pixels on even lines repeat in alternating fashion, interpolated image data are generated representing pixels on even lines in a case where the second field is an odd field and pixels on odd lines in a case where the second field is an even field in order to convert said second field image, which his located between the first field image and the third field image, to a frame image, said method comprising:

detecting whether there is motion between images in windows set at corresponding positions on respective ones of the first field image and third field image wherein the windows are longer vertically than horizontally;

performing first interpolated image data generating processing, when motion has been detected, for generating image data of a pixel at a position corresponding to pixels in said windows based upon image data of pixels, of the second field, neighboring this pixel from above and below; and performing second interpolated image data generating processing, when no motion has been detected, for generating image data of a pixel at a position corresponding to pixels in said windows based upon image data of a corresponding pixel in at least one of said first field image and said third field image.

9. The method according to claim 8, further comprising repeating, at each position of said windows, the motion detection processing and said first interpolated image data generating processing or said second interpolated image data generating processing while the positions of said windows are successively shifted on the first field image and third field image horizontally and vertically in increments of window size.

10. The method according to claim 8, wherein said first interpolated image data generating processing includes:

extracting image data representing pixels above and below a pixel missing in the second field image, as well as image data representing pixels above and below pixels which should be present at positions neighboring the missing pixel in the horizontal direction, obtaining values of sums of the image data representing these pixels, and determining whether values of said sums obtained are increasing or decreasing with regard to pixels in the horizontal direction; and generating data representing the missing pixel using the data representing the pixels above and below the missing pixel when the values of said sums are increasing or decreasing, calculating correlation values between pixels in three directions, namely of pixels above and below and diagonally above and below the missing pixel when the values of said sums are not increasing or decreasing, and generating data representing the missing pixel using data representing pixels which give the highest correlation value.

11. The method according to claim 8, wherein said detecting includes summing, within said windows, differences between absolute values of levels of corresponding pixels in the window of the first field image and the window of the third field image and determining that there is motion when a result of said summing is greater than a predetermined threshold value.

12. The method according to claim 11, wherein said determining includes obtaining the threshold value by multiplying the number of pixels constituting said window by a numerical value of 1~3 when the pixel level is represented by eight bits.

13. The method according to claim 11, wherein said determining includes obtaining the threshold value by multiplying the number of pixels constituting said window by a numerical value of 1.5~2.5 when the pixel level is represented by eight bits.

14. The method according to claim 8, wherein the number of pixels vertically is twice the number of pixels horizontally in said windows.

15. An apparatus for generating interpolated image data in which, when data of consecutive first, second and third field images are given from among a series of image data obtained by interlaced scanning wherein odd field images comprising pixels on odd lines and even field images comprising pixels on even lines repeat in alternating fashion, interpolated image data are generated representing pixels on even lines in a case where the second field is an odd field and pixels on odd lines in a case where the second field is an even field in order to convert said second field image, which is located between the first field image and the third field image, to a frame image, said apparatus comprising:

motion detecting means for detecting whether motion has occurred between images in windows set at corresponding positions on respective ones of the first field image and third field, said motion detecting means detects that motion has occurred when the value of a sum is greater than a predetermined threshold value, wherein said sum is obtained by summing, within said windows, differences between absolute values of levels of corresponding pixels in the window of the first field image and the window of the third field image, wherein said threshold value is a value obtained by multiplying the number of pixels constituting said window by a numerical value of 1~3 when the pixel level is represented by eight bits;

first interpolated image data generating means which, when motion has been detected by said motion detecting means, is for generating image data of a pixel at a position corresponding to pixels in said windows based upon image data of pixels, of the second field, neighboring this pixel from above and below; and second interpolated image data generating means which, when no motion has been detected by said motion detecting means, is for generating image data of a pixel at a position corresponding to pixels in said windows based upon image data of a corresponding pixel in at least one of said first field image and said third field image.

16. The apparatus according to claim 16, wherein the numerical value is between 1.5 and 2.5.

17. The apparatus according to claim 15, further comprising means for performing control so as to repeat, at each position of said windows, motion detection processing by said motion detection processing means and interpolated image data generating processing by said first interpolated image data generating processing means or interpolated image data generating processing said second interpolated image data generating processing while the positions of said windows are successively shifted on the first field image and third field image horizontally and vertically in increments of window size.

18. The apparatus according to claim 1, wherein the number of pixels vertically of said windows is twice the number of pixels horizontally.

19. The apparatus according to claim 15, wherein said first interpolated image data generating means includes:

means for extracting image data representing pixels above and below a pixel missing in the second field image, as well as image data representing pixels above and below pixels which should be present at positions neighboring the missing pixel in the horizontal direction, obtaining values of sums of the image data representing these pixels, and determining whether the values of said sums obtained are increasing or decreasing with regard to pixels in the horizontal direction; and means for generating data representing the missing pixel using the data representing the pixels above and below the missing pixel when the values of said sums are increasing or decreasing, calculating correlation values between pixels in three directions, namely of pixels above and below and diagonally above and below the missing pixel when the values of said sums are not increasing or decreasing, and generating data representing the missing pixel using data representing pixels which give the highest correlation value.

* * * * *